United States Patent
Benazzi et al.

(10) Patent No.: US 6,402,936 B1
(45) Date of Patent: *Jun. 11, 2002

(54) CATALYST THAT COMPRISES A PARTIALLY AMORPHOUS Y ZEOLITE, AN ELEMENT OF GROUP VB AND ITS USE IN HYDROCONVERSION AND HYDROREFINING OF HYDROCARBON PETROLEUM FEEDSTOCKS

(75) Inventors: Eric Benazzi, Chatou; Jean-Marie Deves, Vernouillet; Slavik Kasztelan, Rueil Malmaison, all of (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 0 days.

This patent is subject to a terminal disclaimer.

(21) Appl. No.: 09/572,971

(22) Filed: May 18, 2000

(30) Foreign Application Priority Data

May 19, 1999  (FR) .............................. 99 06445

(51) Int. Cl.⁷ ..................... C01G 17/18; C01G 47/20; B01J 29/12; B01J 29/14; B01J 29/16
(52) U.S. Cl. .............................. 208/111.01; 208/111.3; 208/111.35; 208/58; 208/59; 502/64; 502/65; 502/74; 502/79
(58) Field of Search ................ 502/60, 64, 66, 502/74, 79; 208/111.01, 111.2, 111.3, 111.35, 58, 59

(56) References Cited

U.S. PATENT DOCUMENTS

| 3,640,681 A | * | 2/1972 | Pickert |
|---|---|---|---|
| 3,867,310 A | | 2/1975 | Elliott, Jr. et al. |
| 3,886,094 A | | 5/1975 | Pilato et al. |
| 4,481,104 A | * | 11/1984 | Walsh |
| 4,515,681 A | * | 5/1985 | Cody |
| 4,570,027 A | * | 2/1986 | Boucher et al. |
| 4,663,025 A | * | 5/1987 | Fu |
| 4,777,157 A | * | 10/1988 | Koepke et al. |
| 4,980,328 A | * | 12/1990 | Kukes et al. |
| 5,275,994 A | * | 1/1994 | Weissman et al. |
| 5,393,409 A | * | 2/1995 | Jan et al. |
| 5,785,944 A | * | 7/1998 | Miller |
| 5,972,832 A | * | 10/1999 | Shi et al. |
| 6,171,474 B1 | * | 1/2001 | Kasztelan et al. |
| 6,174,429 B1 | * | 1/2001 | George-Macrhal et al. |

FOREIGN PATENT DOCUMENTS

| EP | 0 967 013 | | 12/1999 |
|---|---|---|---|
| FR | 2 758 278 | | 7/1998 |
| GB | 1390359 | * | 4/1975 |

* cited by examiner

Primary Examiner—Steven P. Griffin
Assistant Examiner—Christina Ildebrando
(74) Attorney, Agent, or Firm—Millen, White, Zelano & Branigan, P.C.

(57) ABSTRACT

The invention relates to a catalyst that contains at least one partially amorphous Y zeolite, at least one metal of group VB, preferably niobium, at least one amorphous or poorly crystallized matrix, optionally at least one metal that is selected from group VIB and group VIII, optionally at least one element that is selected from the group that is formed by P, B, and Si, and optionally at least one element of group VIIA. The invention also relates to the use of this catalyst in hydrocracking and hydrorefining of hydrocarbon feedstocks.

17 Claims, No Drawings

CATALYST THAT COMPRISES A PARTIALLY AMORPHOUS Y ZEOLITE, AN ELEMENT OF GROUP VB AND ITS USE IN HYDROCONVERSION AND HYDROREFINING OF HYDROCARBON PETROLEUM FEEDSTOCKS

This invention relates to a catalyst of hydrocarbon feedstocks, whereby said catalyst comprises at least one partially amorphous Y zeolite, at least one metal of group VB, preferably niobium, at least one oxide-type amorphous or poorly crystallized matrix, optionally at least one metal that is selected from group VIB and group VIII of the periodic table, preferably molybdenum and tungsten, cobalt, nickel and iron. The matrix of the catalyst also optionally contains at least one element that is selected from the group P, B, and Si and optionally at least one element of group VIIA (group 17 of the halogens), such as, for example, fluorine.

This invention also relates to the processes for preparation of said catalyst, as well as its use for hydrocracking hydrocarbon feedstocks such as the petroleum fractions, whereby the fractions that are obtained from carbon contain aromatic compounds, and/or olefinic compounds and/or naphthenic compounds and/or paraffinic compounds, whereby said feedstocks optionally contain metals and/or nitrogen and/or oxygen and/or sulfur. The invention also relates to the use of the catalyst for hydrorefining hydrocarbon feedstocks.

The hydrocracking of heavy petroleum fractions is a very important refining process that makes it possible to produce, starting from excess heavy feedstocks that cannot be readily upgraded, lighter fractions such as gasolines, jet fuels and light gas oils that the refiner seeks to adapt his production to the structure of the demand. Certain hydrocracking processes make it possible also to obtain a greatly purified residue that can constitute an excellent base for oils. Relative to the catalytic cracking, the advantage of the catalytic hydrocracking is to provide middle distillates, jet fuels and gas oils of very good quality. The gasoline that is produced has a much lower octane number than the one that is obtained from the catalytic cracking.

The catalysts that are used in hydrocracking are all of bifunctional type that link an acid function to a hydrogenating function. The acid function is provided by large-surface substrates (generally 150 to 800 $m^2 \cdot g^{-1}$) that have a surface acidity, such as halogenated aluminas (in particular chlorinated or fluorinated), combinations of boron oxides and aluminum oxides, amorphous silica-aluminas and zeolites. The hydrogenating function is provided either by one or several metals of group VIII of the periodic table, such as iron, cobalt, nickel, ruthenium, rhodium, palladium, osmium, iridium and platinum, or by a combination of at least one metal of group VI of the periodic table, such as molybdenum and tungsten, and at least one metal of group VIII.

The balance between the two acid and hydrogenating functions is the basic parameter that controls the activity and the selectivity of the catalyst. A weak acid function and a strong hydrogenating function provide catalysts that are not very active and that work at a temperature that is generally high (greater than or equal to 390° C.) and at a low feed volumetric flow rate (the VVH expressed by volume of feedstock to be treated per unit of volume of catalyst and per hour is generally less than or equal to 2) but provided with very good selectivity of middle distillates. Conversely, a strong acid function and a weak hydrogenating function provide catalysts that are active but that have less favorable selectivities of middle distillates. The search for a suitable catalyst will therefore be centered on a judicious choice of each of the functions for adjusting the activity/selectivity pair of the catalyst.

Thus, one of the great advantages of the hydrocracking is to exhibit a great flexibility at various levels: flexibility with regard to the catalysts used, which brings about flexibility of the feedstocks that are to be treated and with regard to products that are obtained. An easy parameter to control is the acidity of the substrate of the catalyst.

The conventional catalysts for catalytic hydrocracking, for the large majority, consist of weakly acidic substrates, such as amorphous silica-aluminas, for example. These systems are used more particularly for producing middle distillates of very good quality and also oil bases when their acidity is very weak.

The family of amorphous silica-aluminas is found in slightly acid substrates. Many catalysts of the hydrocracking market have a silica-alumina base combined either with a metal of group VIII or, preferably when the heteroatomic poison contents of the feedstock to be treated exceed 0.5% by weight, with a combination of sulfides of the metals of groups VIB and VIII. These systems have very good selectivity in middle distillates, and the products that are formed are of good quality. These catalysts, for the less acidic among them, can also produce lubricating bases. The drawback of all of these catalytic systems with an amorphous substrate base is their weak activity, as mentioned.

The catalysts that comprise the FAU-structural-type Y zeolite or the catalysts that comprise, for example, a beta-type zeolite have a higher catalytic activity than those of the amorphous silica-aluminas, but they have higher selectivities in light products. In the prior art, the zeolites used for the preparation of hydrocracking catalysts are characterized by several magnitudes like their $SiO2/Al_2O_3$ framework molar ratio, their crystalline parameter, their pore distribution, their specific surface area, their sodium ion uptake capacity, or else their capacity for adsorption of water vapor. Thus, the above patents of the applicant (French Patents FR-A-2,754, 742 and FR-A-2,754,826) use a zeolite whose crystalline parameter is between 24.15 and 24.38 Å, the $SiO_2/Al_2O_3$ framework molar ratio between 500 and 21, the sodium content less than 0.15% by weight, the sodium ion uptake capacity greater than 0.85 g of Na/100 g of zeolite, the specific surface area greater than 400 m2/g, the adsorption capacity of the water vapor greater than 6%, and 1 to 20% of the pore volume is contained in the pores with a diameter of between 20 and 80 Å.

In all of the cases of the prior art, the zeolites that are used have high crystalline fractions (or degree of crystallinity) and high peak rates.

Furthermore, simple sulfides of elements of group VB have been described as components of hydrorefining catalysts of hydrocarbon feedstocks, such as, for example, the niobium trisulfide in U.S. Pat. No. 5,294,333. Mixtures of simple sulfides that comprise at least one element of group VB and an element of group VIB also have been tested as components of hydrorefining catalysts of hydrocarbon feedstocks, such as, for example, in U.S. Pat. Nos. 4,910,191 or 5,275,994.

The current processes for catalytic hydrorefining use catalysts that can promote the main reactions that are useful for exploiting heavy fractions, in particular the hydrogenation of the aromatic cores (HAR), hydrodesulfurization (HDS), hydrodenitrating (HDN) and other hydroeliminations. Hydrorefining is used to treat feedstocks such as gasolines, vacuum gas oils, residues under conditions of atmosphere or a vacuum that may or may not be deasphalted. For example, catalytic cracking and hydrocracking processes are indicated for the treatment of feedstocks. The nitrogen-containing heterocyclic compounds that are encountered in the heavy fractions act as poisons with very marked toxicity for the cracking or hydrocracking catalysts. Consequently, the denitrating of the catalytic hydrocracking feedstocks constitutes one of the possible means for improving the overall yield of these processes, and it is then desirable to reduce as much as possible the nitrogen content of the feedstocks before cracking them. At least one hydrorefining stage is usually integrated into each of the designs known for upgrading heavy petroleum fractions.

The research work that is carried out by the applicant on numerous zeolites and microporous solids and on hydrogenating active phases led him to discover that, surprisingly enough, selectivities of middle distillates (kerosene+gas oil) that are higher than with the catalysts that are known in the prior art and that contain a Y zeolite are obtained by using a catalyst according to the invention that comprises at least one partially amorphous Y zeolite, at least one amorphous or poorly crystallized mineral matrix that is generally porous, such as alumina, at least one element of group VB of the periodic table, such as tantalum, niobium or vanadium, preferably niobium, and optionally at least one element of group VIB of said periodic table, such as chromium, molybdenum or tungsten, preferably molybdenum or tungsten, even more preferably molybdenum, optionally an element of group VIII, i.e., an element that is selected from the group that consists of: Fe, Ru, Os, Co, Rh, Ir, Ni, Pd, Pt, preferably iron, cobalt or nickel, optionally an element that is selected from the group that is formed by P, B and Si, optionally an element of group VIIA and preferably fluorine.

It was possible to observe that this catalyst has a more significant hydrocracking and hydrorefining activity than those of the catalytic formulas that are known in the prior art.

The catalyst of this invention also contains in % by weight relative to the total mass of the catalyst:

0.1 to 99.8%, preferably 0.1 to 90% and even more preferably 0.1 to 80%, of a partially amorphous Y zeolite, 0.1 to 60%, preferably 0.1 to 50% and even more preferably 0.1 to 40% of at least one metal that is selected from group VB, 0.1 to 99.8%, preferably 0.1 to 99%, preferably 1 to 98%, of an oxide-type amorphous or poorly crystallized porous mineral matrix, whereby said catalyst is characterized in that it optionally contains:

0 to 60%, advantageously 0.1 to 60%, preferably 0.1 to 50% and even more preferably 0.1 to 40% of at least one hydro-dehydrogenating metal that is preferably selected from among the elements of group VIII and group VIB, 0 to 20%, preferably 0.1 to 15% and even more preferably 0.1 to 10%, of at least one promoter element that is selected from the group that consists of silicon, boron and phosphorus, not including the silicon that is optionally contained in the zeolite framework, preferably the element is boron and/or silicon, 0 to 20%, preferably 0.1 to 15% and even more preferably 0.1 to 10%, of at least one element that is selected from group VIIA, preferably fluorine.

The partially amorphous Y zeolite that is used in this invention is a solid that has the following characteristics:

i/ a peak rate that is less than about 0.40, preferably less than about 0.30, ii/ a crystalline fraction that is expressed relative to a reference Y zeolite in sodium form (Na) that is less than about 60%, preferably less than about 50%.

The solid, partially amorphous Y zeolites that are part of the composition of the catalyst according to the invention preferably have at least one (and preferably all) of the other following characteristics:

| | |
|---|---|
| -iii/ | an overall Si/Al ratio that is greater than 15, preferably greater than 20 and less than 150, |
| -iv/ | an Si/Al$^{iv}$ framework ratio that is greater than or equal to the overall Si/Al ratio, |
| -v/ | a pore volume that is at least equal to 0.20 ml/g of solid whose fraction, between 8% and 50%, consists of pores that have a diameter of at least 5 nm (nanometer) or so |
| -vi/ | a specific surface area of 210–800 m$^2$/g, preferably 250–750 m$^2$/g and advantageously 300–600 m$^2$/g. |

The peak rates and the crystalline fractions are determined by x-ray diffraction by using a procedure that is derived from the ASTM D3906-97 method "Determination of Relative X-ray Diffraction Intensities of Faujasite-Type-Containing Materials." It is possible to refer to this method for the general conditions of application of the procedure, and, in particular, for the preparation of samples and references.

A diffractogram consists of lines that are characteristic of the crystallized fraction of the sample and a bottom, essentially produced by the diffusion of the amorphous or microcrystalline fraction of the sample (a weak diffusion signal is linked to the equipment, air, sample holder, etc.) The peak rate of a zeolite is the ratio, in a predefined angular zone (typically 8 to 40° 2θ when Kα radiation of copper is used, 1=0.154 nm), of the area of the lines of the zeolite (peaks) to the overall area of the diffractogram (peaks+trough). This peaks/(peaks+trough) ratio is proportional to the amount of crystallized zeolite in the material.

To estimate the crystalline fraction of a Y zeolite sample, the peak rate of the sample will be compared to that of a reference that is considered as being 100% crystallized (NaY, for example). The peak rate of a perfectly crystallized NaY zeolite is on the order of 0.55 to 0.60.

The peak rate of a standard USY zeolite is 0.45 to 0.55; its crystalline fraction relative to a perfectly crystallized NaY is 80 to 95%. The peak rate of the solid that is the object of this invention is less than 0.40 and preferably less than 0.35. Its crystalline fraction is therefore less than 70%, preferably less than 60%.

The partially amorphous zeolites are prepared according to the techniques that are generally used for dealuminification, starting from commercially available Y zeolites, i.e., that generally have high crystallinities (at least 80%). More generally, it will be possible to start from zeolites that have a crystalline fraction of at least 60% or at least 70%.

The Y zeolites that are used generally in the hydrocracking catalysts are produced by modification of the Na-Y zeolite that is available commercially. This modification makes it possible to end in so-called stabilized, ultrastabilized or else dealuminified zeolites. This modification is carried out by at least one of the dealuminification techniques, and, for example the hydrothermic treatment, the acid attack. Preferably, this modification is carried out by combination of three types of operations that are known to one skilled in the art: hydrothermic treatment, ion exchange and acid attack. The hydrothermic treatment is perfectly defined by the union of operating variables, such as temperature, duration, total pressure and partial pressure of water vapor. This treatment has the effect of extracting the silico-aluminum framework of the zeolite of the aluminum atoms. The consequence of this treatment is an increase in the SiO2/Al2O3 framework molar ratio and a reduction of the parameter of the crystalline mesh.

The ion exchange takes place generally by immersion of the zeolite into an aqueous solution that contains ions that are able to be fixed on the cationic exchange sites of the zeolite. The sodium cations that are present in the zeolite after crystallization are also removed.

The acid attack operation consists in bringing the zeolite into contact with an aqueous solution of a mineral acid. The severity of the acid attack is adjusted by the acid concentration, the duration and the temperature. Carried out on a zeolite that is treated hydrothermically, this treatment has the effect of eliminating the aluminum radicals that are extracted from the framework and that plug the micropores of the solid.

The partially amorphous Y zeolite that is used in the catalysts according to the invention is at least in part in hydrogen form or acid (H+) form or ammonium (NH4+) form or cationic form, whereby said cation is selected from the group that is formed by the groups IA, IB, IIA, IIB, IIIA, IIIB (including rare earths), Sn, Pb and Si; it is preferably at least in part in H+form, and it can also be used at least in part in cationic form (as defined above).

The partially amorphous Y zeolite that is at least partly in acid form (and preferably in H form in its entirety) or partially exchanged with cations, for example alkaline cations and/or alkaline-earth cations, will preferably be used.

The catalyst that comprises at least one partially amorphous Y zeolite also contains a hydrogenating function. The hydrogenating function as it was defined above preferably comprises at least one metal that is selected from the group that is formed by the metals of group VIB and group VIII of the periodic table.

In an implementation of the invention, the catalyst preferably contains at least one element that is selected from the group that is formed by boron, silicon and phosphorus. The catalyst also contains at least one element of group VIIA, preferably chlorine and fluorine, and also optionally at least one element of group VIIB.

Boron, silicon and/or phosphorus can be in the matrix, the zeolite or are preferably deposited on the catalyst and then mainly located on the matrix.

The element that is introduced, and in particular the silicon that is mainly located on the matrix of the substrate, can be characterized by techniques such as the Castaing microprobe (distribution profile of various elements), the electronic microscopy by transmission coupled to an X analysis of the components of the catalysts or else by the establishment of a distribution cartography of elements that are present in the catalyst by electronic microprobe.

The metals of group VB and group VIII of the catalyst of this invention can be present completely or partially in metallic form and/or oxide form and/or sulfide form.

The usually amorphous or poorly crystallized porous mineral matrix generally consists of at least one refractory oxide in amorphous or poorly crystallized form. Said matrix is preferably selected from the group that is formed by alumina, silica, silica-alumina, or a mixture of at least two of the oxides that are cited above. It is also possible to select the aluminates. It is preferred to use matrices that contain alumina under all of these forms that are known to one skilled in the art, for example the gamma-alumina.

The catalysts according to the invention can be prepared according to all of the methods that are well known to one skilled in the art.

A preferred process for preparation of the catalyst according to this invention comprises the following stages:

a) A solid that is referred to below as the precursor, containing at least one of the following compounds: at least one matrix, at least one partially amorphous Y zeolite, optionally at least one element that is selected by the elements of group VIB and group VIII, optionally at least one element that is selected from the phosphorus, boron and silicon group, optionally at least one element of group VIIA, whereby the whole is preferably shaped, is dried and weighed, b) the dry solid that is obtained in stage a) is calcined at a temperature of at least 150° C., c) the precursor solid that is defined in stage b) is impregnated by a solution that contains an element of group VB, preferably niobium, d) the moist solid is left under a moist atmosphere at a temperature of between 10 and 120° C., e) the moist solid that is obtained in stage d) is dried at a temperature of between 60 and 150° C.

The preparation of the precursor of stage a) above can be carried out according to all of the standard methods that are known to one skilled in the art. According to another preferred process of preparation, the precursor is obtained by mixing at least one matrix and at least one partially amorphous Y zeolite then shaping, drying and calcination. The elements of groups VIB, VIII and those that are selected from among phosphorus, boron, silicon and the elements of group VIIA, are then optionally introduced by any method that is known to one skilled in the art, at any of stages a) to e) before or after the shaping and before or after the calcination of the precursor or the catalyst.

The shaping can be carried out by, for example, extrusion, pelletizing, by the oil-drop method, by turntable granulation or by any other method that is well known to one skilled in the art. At least one calcination can be carried out after any of the stages of the preparation; it is usually carried out under air at a temperature of at least 150° C., preferably at least 300° C. Thus, the product that is obtained at the end of stage a) and/or stage e) and/or optionally after the introduction of the element or elements of groups VIB, VIII, those that are selected from among the phosphorus, boron, silicon and the elements of group VIIA, is then optionally calcined under air, usually at a temperature of at least 150° C., preferably at least 250° C., currently about 350 to 1000° C.

The hydrogenating element can be introduced at any stage of the preparation, preferably during the mixing or very preferably after shaping. The shaping is followed by calcination, and the hydrogenating element can also be introduced before or after this calcination. The preparation generally ends with calcination at a temperature of 250 to 600° C. Another of the preferred methods according to this invention consists in mixing at least one partially amorphous Y zeolite in a moist alumina gel for several tens of minutes, then in passing the paste that is thus obtained through a die to form extrudates with a diameter of between 0.4 and 4 mm. The hydrogenating function can then be introduced in part only (case, for example, of combinations of oxides of metals of groups VIB and VIII) or completely at the time of mixing of at least one partially amorphous Y zeolite, with at least one oxide gel that is selected as a matrix. It can also be introduced by one or more ion exchange operations on the calcined substrate that consists of at least one partially amorphous Y zeolite that is dispersed in at least one matrix with solutions that contain the precursor salts of the selected metals, when the latter belong to group VIII. It can also be introduced by one or more impregnation operations of the substrate that is shaped and calcined by a solution of the precursors of oxides of metals of groups VIII (in particular cobalt and nickel) when the precursors of the oxides of metals of group VIB (in particular molybdenum or tungsten) were previously introduced when the substrate was mixed. Finally, it can also be introduced by one or more operations for impregnation of the calcined substrate that consists of at least one partially amorphous Y zeolite and at least one matrix by solutions that contain the precursors of the oxides of metals of group VI and/or VIII, whereby the precursors of the oxides of metals of group VIII are preferably introduced after those of group VIB or at the same time as the latter.

The substrate is preferably impregnated by an aqueous solution. The impregnation of the substrate is preferably carried out by the so-called "dry" impregnation method that is well known to one skilled in the art. The impregnation can be carried out in a single stage by a solution that contains all of the constituent elements of the final catalyst.

The boron and/or silicon and/or phosphorus and optionally the element that is selected from group VIIA, preferably fluorine, can be introduced into the catalyst at any level of the preparation and according to any technique that is known to one skilled in the art.

A preferred method according to the invention consists in depositing the selected promoter element or elements, for example the boron-silicon pair, on the precursor that may or may not be calcined but is preferably calcined. For this purpose, an aqueous solution is prepared from at least one boron salt such as the ammonium biborate or the ammonium pentaborate in an alkaline medium and in the presence of oxidized water, and a so-called dry impregnation is initiated in which the volume of the pores of the precursor is filled by a solution that contains, for example, boron. In the case where, for example, silicon is also deposited, for example a solution of a silicone-type silicon compound will be used.

The deposit of boron and silicon can also be done simultaneously by using, for example, a solution that contains a boron salt and a silicone-type silicon compound. Thus, for example, in the case where the precursor is a nickel-molybdenum-type catalyst that is supported on alumina and partially amorphous Y zeolite, it is possible to impregnate this precursor by the aqueous solution of ammonium biborate and the Rhodorsil E1P silicone of the Rhone-Poulenc Company, to initiate drying at, for example, 80° C., then to impregnate by an ammonium fluoride solution, to initiate drying at, for example, 80° C., and to initiate calcination for example and preferably under air in a flushed bed, for example at 500° C. for 4 hours. The element of group VB is then deposited according to any method that is known to one skilled in the art.

The promoter element that is selected from the group that is formed by silicon, boron, and phosphorus, and the element that is selected from among the halide ions of group VIIA can be introduced by one or more impregnation operations with excess solution in the calcined precursor.

Thus, for example, it is possible to impregnate the precursor by an aqueous solution of ammonium biborate or the Rhodorsil E1P silicone of the Rhône-Poulenc Company, to initiate drying at, for example, 80° C., then to impregnate by an ammonium fluoride solution, to initiate drying at, for example, 80° C., and to initiate calcination for example and preferably under air in a flushed bed, for example at 500° C. for 4 hours. Then, the element of group VB is deposited according to any method that is known to one skilled in the art.

Other impregnation sequences can be used to obtain the catalyst according to the invention.

It is possible, for example, to impregnate the precursor with a solution that contains one of the promoter elements (P, B, Si), to dry it and to calcine it and then to impregnate the solid that is obtained with the solution that contains another promoter element, to dry it, to calcine it. It is also possible to impregnate the precursor with a solution that contains two of the promoter elements, to dry, to calcine, then to impregnate the solid that is obtained with the solution that contains another promoter element, to dry it and to initiate final calcination. The element of group VB is then deposited according to any method that is known to one skilled in the art.

The catalyst of this invention can therefore optionally contain at least one element of group VIII, such as iron, cobalt, nickel, ruthenium, rhodium, palladium, osmium, iridium or platinum. Among the metals of group VIII, it is preferred to use a metal that is selected from the group that is formed by iron, cobalt, nickel, and ruthenium. The catalyst according to the invention can also contain at least one element of group VIB, preferably tungsten and molybdenum. The combinations of the following metals are advantageously used: nickel-molybdenum, cobalt-molybdenum, iron-molybdenum, iron-tungsten, nickel-tungsten, cobalt-tungsten, and the preferred combinations are: nickel-molybdenum, cobalt-molybdenum, and nickel-tungsten. It is also possible to use combinations of three metals, for example nickel-cobalt-molybdenum. The following metal combinations are advantageously used: nickel-niobium-molybdenum, cobalt-niobium-molybdenum, iron-niobium-molybdenum, nickel-niobium-tungsten, cobalt-niobium-tungsten, iron-niobium-tungsten, whereby the preferred combinations are: nickel-niobium-molybdenum, cobalt-niobium-molybdenum. It is also possible to use combinations of four metals, for example, nickel-cobalt-niobium-molybdenum. It is also possible to use combinations that contain a noble metal, such as ruthenium-niobium-molybdenum or else ruthenium-nickel-niobium-molybdenum.

In the case where the elements are introduced into several impregnations of the corresponding precursor salts, an intermediate drying stage of the catalyst should be carried out at a temperature, for example, that is preferably between 250 and 600° C.

The impregnation of the molybdenum can be facilitated by adding phosphoric acid into the ammonium paramolybdate solutions, which makes it possible also to introduce phosphorus so as to promote catalytic activity. Other phosphorus compounds can be used as is well known to one skilled in the art.

The impregnation of niobium can be facilitated by adding oxalic acid and optionally ammonium oxalate into the niobium oxalate solutions. Other compounds can be used to improve the solubility and to facilitate the impregnation of niobium as is well known to one skilled in the art.

The element sources of group VB that can be used are well known to one skilled in the art. For example, among the niobium sources, it is possible to use oxides, such as diniobium pentaoxide $Nb_2O_5$, niobic acid $Nb_2O_5.H_2O$, niobium hydroxides and polyoxoniobates, the niobium alkoxides of formula $Nb(OR_1)_3$ where $R_1$ is an alkyl radical, niobium oxalate $NbO(HC_2O_4)_5$, and ammonium niobate. Niobium oxalate or ammonium niobate is preferably used.

The preferred phosphorus source is the orthophosphoric acid $H_3PO_4$, but its salts and esters such as the ammonium phosphates are also suitable. Phosphorus can be introduced, for example, in the form of a mixture of phosphoric acid and a basic organic compound that contains nitrogen, such as ammonia, primary and secondary amines, cyclic amines, compounds of the pyridine family and quinolines, and compounds of the pyrrole family.

Numerous silicon sources can be used. It thus is possible to use ethyl orthosilicate $Si(OEt)_4$, siloxanes, polysiloxanes, silicones, silicone emulsions, halide silicates such as ammonium fluorosilicate $(NH_4)_2SiF_6$ or sodium fluorosilicate $Na_2SiF_6$. The silicomolybdic acid and its salts, and the silicotungstic acid and its salts can also advantageously be used. Silicon can be added, for example, by impregnation of ethyl silicate in solution in a water/alcohol mixture. The silicon can be added, for example, by impregnation of a silicone-type silicon compound that is suspended in water.

The boron source can be boric acid, preferably orthoboric acid $H_3BO_3$, ammonium biborate or pentaborate, boron oxide, and boric esters. The boron can be introduced, for example, in the form of a mixture of boric acid, oxidized water and a basic organic compound that contains nitrogen, such as ammonia, primary and secondary amines, cyclic amines, compounds of the pyridine family and quinolines and compounds of the pyrrole family. Boron can be introduced by, for example, a boric acid solution in a water/alcohol mixture.

The sources of elements of group VIIA that can be used are well known to one skilled in the art. For example, the fluoride anions can be introduced in the form of hydrofluoric acid, or its salts. These salts are formed with alkaline metals, ammonium or an organic compound. In the latter case, the salt is advantageously formed in the reaction mixture by reaction between the organic compound and the hydrofluoric acid. It is also possible to use hydrolyzable compounds that can release fluoride anions in water, such as ammonium fluorosilicate $(NH_4)_2$ $SiF_6$, silicon tetrafluoride $SiF_4$ or sodium tetrafluoride $Na_2SiF_6$. Fluorine can be introduced by, for example, impregnation of an aqueous solution of hydrofluoric acid or ammonium fluoride.

The sources of elements of group VIB that can be used are well known to one skilled in the art. For example, among the molybdenum and tungsten sources, it is possible to use oxides and hydroxides, molybdic and tungstic acids and their salts, in particular ammonium salts such as ammonium molybdate, ammonium heptamolybdate, ammonium tungstate, phosphomolybdic acid, phosphotungstic acid and their salts, silicomolybdic acid, silicotungstic acid and their salts. The ammonium oxides and salts such as ammonium molybdate, ammonium heptamolybdate and ammonium tungstate are preferably used.

The sources of elements of group VIII that can be used are well known to one skilled in the art. For example, for the non-noble metals, nitrates, sulfates, phosphates, halides, for example chlorides, bromides, and fluorides, and carboxylates, for example acetates and carbonates, will be used. For the noble metals, halides will be used, for example chlorides, nitrates, acids such as chloroplatinic acid, and oxychlorides such as ruthenium ammoniacal oxychloride.

The catalysts that are obtained by this invention are generally shaped. The grains that are then obtained have different shapes and sizes. They are generally used in the form of cyclical or multilobar extrudates, such as bilobar, trilobar, multilobar extrudates of straight or twisted shape, but they can optionally be produced and used in the form of crushed powder, tablets, rings, balls, and wheels. They have a specific surface area that is measured by nitrogen adsorption according to the BET method (Brunauer, Emmett, Teller, J. Am. Chem. Soc., Vol. 60, 309–316 (1938)) of between 50 and 600 $m^2/g$, a pore volume that is measured by mercury porosimetry of between 0.2 and 1.5 $cm^3/g$ and a pore size distribution that can be monomodal, bimodal or polymodal.

The catalysts that are obtained by this invention are used for conversion, in particular hydroconversion of hydrocarbon feedstocks such as the petroleum fractions and, for example, hydrocracking. The hydroconversion catalyst then contains at least one hydro-dehydrogenating element. The feedstocks that are used in the process are gasolines, kerosenes, gas oils, vacuum gas oils, atmospheric residues, vacuum residues, atmospheric distillates, vacuum distillates, heavy fuels, oils, waxes and paraffins, used oils, residues or deasphalted crude oils, feedstocks that are obtained from thermal or catalytic conversion processes and their mixtures. They contain heteroatoms such as sulfur, oxygen, and nitrogen and optionally metals.

The catalysts that are thus obtained are used advantageously for hydrocracking in particular vacuum distillate-type heavy hydrocarbon fractions, deasphalted or hydrotreated residues or the equivalent. The heavy fractions preferably consist of at least 80% by volume of compounds whose boiling points are at least 350° C. and preferably between 350 and 580° C. (i.e., corresponding to compounds that contain at least 15 to 20 carbon atoms). They generally contain heteroatoms such as sulfur and nitrogen. The nitrogen content is usually between 1 and 5000 ppm by weight, and the sulfur content is between 0.01 and 5% by weight.

The hydrocracking conditions such as temperature, pressure, hydrogen recycling rate, hourly volumetric flow rate, can be very variable based on the nature of the feedstock, the quality of the desired products and the installations used by the refiner. The temperature is generally higher than 200° C. and often between 250° C. and 480° C. The pressure is greater than 0.1 MPa and often greater than 1 MPa. The amount of hydrogen is at least 50 liters of hydrogen per liter of feedstock and often between 80 and 5000 liters of hydrogen per liter of feedstock. The hourly volumetric flow rate is generally between 0.1 and 20 volumes of feedstock per volume of catalyst and per hour ($h^{-1}$).

The catalysts of this invention are preferably subjected to a sulfurization treatment that makes it possible to transform, at least in part, the metallic radicals into sulfide before they are brought into contact with the feedstock that is to be treated. This activation treatment by sulfurization is well known to one skilled in the art and can be carried out by any method that is already described in the literature.

The sulfurization of the solids (catalysts) that contain at least one element of group VB in oxide form proves to be very difficult by the majority of standard sulfurization methods that are known to one skilled in the art. Actually, the catalysts that contain at least one element of group VB that is supported on an alumina-type matrix are known for being very difficult to sulfurize once the group VB element-alumina combination has been calcined at a temperature that is higher than 200° C.

Sulfurization can be done by any method that is known to one skilled in the art and at any stage of the preparation. The method that is preferred according to the invention consists in heating the non-calcined catalyst under a stream of a hydrogen-hydrogen sulfide mixture or under a stream of a nitrogen-hydrogen sulfide mixture or else under pure hydrogen sulfide at a temperature of between 150 and 800° C., preferably between 250 and 600° C., generally in a flushed-bed reaction zone. Thus, for example, in the preferred case where the metal of group VB is niobium and where the metal of group VIB is molybdenum, it is possible to impregnate the substrate by ammonium heptamolybdate, to initiate drying at 80° C., then to impregnate by niobium oxalate, to initiate drying at 80° C. and to initiate sulfurization for example and preferably by $H_2S$ in a flushed bed, for example at 500° C. for 10 hours.

The sulfide source can be elementary sulfur, carbon sulfide, hydrogen sulfide, sulfur-containing hydrocarbons such as dimethyl sulfide, dimethyl disulfide, mercaptans, compounds of thiophene, thiols, polysulfides such as, for example, di-tert-nonylpolysulfide or TPS-37 of the ATOCHEM Company, the sulfur-rich petroleum fractions such as gasoline, kerosene, gas oil, alone or mixed with one of the sulfur-containing compounds cited above. The preferred sulfur source is carbon sulfide or hydrogen sulfide.

The catalyst of this invention advantageously can be used for hydrocracking hydrocarbon feedstocks, in particular vacuum distillate-type fractions, more particularly, for example, fractions with a sulfur content that is higher than 0.1% by weight and with a nitrogen content that is higher than 10 ppm.

In a first embodiment of partial hydrocracking that is also called soft hydrocracking, the conversion level is less than 55%. The catalyst according to the invention is then used at a temperature that is generally greater than or equal to 230° C. and preferably between 300° C. and 480° C., and often between 350° C. and 450° C. The pressure is generally higher than 2 MPa and preferably higher than 3 MPa, and less than 12 MPa and preferably less than 10 MPa. The amount of hydrogen is at least 100 liters of hydrogen per liter of feedstock and often between 200 and 3000 liters of hydrogen per liter of feedstock. The hourly volumetric flow rate is generally between 0.1 and 10 $h^{-1}$. Under these conditions, the catalysts of this invention have better activity in conversion, hydrodesulfurization, and hydrodenitrating than the commercial catalysts.

In a second embodiment, the catalyst of this invention can be used for partial hydrocracking, advantageously under moderate hydrogen pressure conditions, of, for example, vacuum distillate-type fractions that are high in sulfur and nitrogen and that have been previously hydrotreated. In this hydrocracking mode, the conversion level is less than 55%. In this case, the conversion process of the petroleum fraction takes place in two stages, whereby the catalysts according to the invention are used in the second stage. The catalyst of the first stage has a hydrotreatment function and comprises a matrix that preferably has an alumina base and preferably does not contain zeolite, and at least one metal that has a hydrogenating function. Said matrix is an oxide-type amorphous or poorly crystallized porous mineral matrix. It is possible to cite by way of nonlimiting example the aluminas, silicas, and silica-aluminas. It is also possible to select aluminates. It is preferred to use matrices that contain alumina under all of these forms that are known to one skilled in the art and even more preferably the aluminas, for example the gamma-alumina. The hydrotreatment function is ensured by at least one metal or metal compound of group VIII, such as, for example, nickel and cobalt. It is possible to use a combination of at least one metal or metal compound of group VIB (for example molybdenum or tungsten) and at least one metal or metal compound of group VIII (for example cobalt or nickel) of the periodic table. The total concentration of oxides of metals of groups VIB and VIII is preferably between 5 and 40% by weight and very preferably between 7 and 30% by weight, and the ratio by weight that is expressed in terms of metal oxide of metal (or metals) of group VIB to metal (or metals) of group VIII is preferably between 1.25 and 20 and very preferably between 2 and 10. In addition, this catalyst can contain phosphorus. The phosphorus content, expressed by concentration of diphosphorus pentaoxide $P_2O_5$, preferably will be at most 15%, more preferably between 0.1 and 15% by weight and very preferably between 0.15 and 10% by weight. It can also contain boron in a B/P ratio=1.05–2 (atomic), whereby the sum of B and P contents expressed in oxides is preferably between 5 and 15% by weight.

The first stage takes place generally at a temperature of 350–460° C., preferably 360–450° C., a pressure of at least 2 MPa; and preferably 3 MPa, an hourly volumetric flow rate of 0.1–5 $h^{-1}$ and preferably 0.2–2 $h^{-1}$ and with an amount of hydrogen of at least 100 liters of hydrogen per liter of feedstock and preferably 260–3000 liters of hydrogen per liter of feedstock.

For the conversion stage with the catalyst according to the invention (or second hydrocracking stage), the temperatures are generally greater than or equal to 230° C. and often between 300° C. and 480° C., preferably between 330° C. and 450° C. The pressure is generally at least 2 MPa and preferably at least 3 MPa, and less than 12 MPa and preferably less than 10 MPa. The amount of hydrogen is at least 100 liters of hydrogen per liter of feedstock and often between 200 and 3000 liters of hydrogen per liter of feedstock. The hourly volumetric flow rate is generally between 0.15 and 10 $h^{-1}$. Under these conditions, the catalysts of this invention have a better activity in conversion, hydrodesulfurization, and hydrodenitrating and a better selectivity in middle distillates than the commercial catalysts. The service life of the catalysts is also improved in the moderate pressure range.

In another embodiment, the catalyst of this invention can be used for hydrocracking under high hydrogen pressure conditions of at least 5 MPa. The treated fractions are, for example, of vacuum distillate type and high in sulfur and nitrogen and have been previously hydrotreated. In this hydrocracking mode, the conversion level is higher than 55%. In this case, the petroleum fraction conversion process takes place in two stages, whereby the catalyst according to the invention is used in the second stage.

The catalyst of the first stage has a hydrotreatment function and comprises a matrix that preferably has an alumina base and that preferably does not contain zeolite and at least one metal that has a hydrogenating function. Said matrix can also consist of or contain silica, silica-alumina, boron oxide, magnesia, zirconia, titanium oxide or a combination of these oxides. The hydro-dehydrogenating function is ensured by at least one metal or metal compound of group VIII, such as nickel and cobalt in particular. It is possible to use a combination of at least one metal or metal compound of group VI (in particular molybdenum or tungsten) and at least one metal or metal compound of group VIII (in particular cobalt or nickel) of the periodic table. The total concentration of oxides of metals of groups VI and VIII is between 5 and 40% by weight and preferably between 7 and 30% by weight, and the ratio by weight that is expressed in metallic oxide of metal (or metals) of group VI to metal (or metals) of group VIII is between 1.25 and 20 and preferably between 2 and 10. In addition, this catalyst can contain phosphorus. The phosphorus content, expressed in concentration of diphosphorus pentaoxide $P_2O_5$, will be at most 15% generally, preferably between 0.1 and 15% by weight and preferably between 0.15 and 10% by weight. It can also contain boron in a B/P ratio=1.02–2 (atomic), whereby the sum of B and P contents expressed in oxides is 5–15% by weight.

The first stage generally takes place at a temperature of 350–460° C., preferably 360–450° C., a pressure of at least 2 MPa and preferably at least 3 MPa, an hourly volumetric flow rate of 0.1–5 h$^{-1}$ and preferably 0.2–2 h$^{-1}$ and with an amount of hydrogen of at least 100 liters of hydrogen per liter of feedstock, and preferably 260–3000 liters of hydrogen per liter of feedstock.

For the conversion stage with the catalyst according to the invention (or second stage), the temperatures are in general greater than or equal to 230° C. and often between 300° C. and 480° C. and preferably between 300° C. and 440° C. The pressure is generally greater than 5 MPa and preferably greater than 7 MPa. The amount of hydrogen is at least 100 liters of hydrogen per liter of feedstock and often between 200 and 3000 liters of hydrogen per liter of feedstock. The hourly volumetric flow rate is in general between 0.15 and 10 h$^{-1}$.

Under these conditions, the catalysts of this invention have a better conversion activity than the commercial catalysts, even for considerably lower zeolite contents than those of the commercial catalysts.

The catalysts that are obtained by this invention are also used for hydrorefining hydrocarbon feedstocks such as the petroleum fractions, the fractions that are obtained from carbon or hydrocarbons that are produced from natural gas. The main reactions that are employed are the hydrogenation of aromatic compounds, hydrodenitrating, hydrodeoxygenation, hydrodesulfurization, hydrodemetallization, accompanied most often by hydrocracking. The hydrocarbon feedstocks contain aromatic compounds and/or olefinic compounds and/or napthenic compounds and/or paraffinic compounds and optionally metals and/or nitrogen and/or oxygen and/or sulfur. In these uses, the catalysts that are obtained by this invention have an improved activity relative to the prior art.

The feedstocks that are used in the process are gasolines, gas oils, vacuum gas oils, atmospheric residues, vacuum residues, atmospheric distillates, vacuum distillates, heavy fuels, oils, waxes, and paraffins, used oils, deasphalted residues or crude oils, feedstocks that are obtained from thermal or catalytic conversion processes and their mixtures. They contain heteroatoms such as sulfur, oxygen and nitrogen and at least one metal. The heavy fractions, as such and by way of non-exhaustive examples, the vacuum distillates, deasphalted or hydrotreated residues or the equivalent, preferably consist of at least 80% by volume of compounds whose boiling points are at least 350° C. and preferably between 350 and 580° C. (i.e., corresponding to compounds that contain at least 15 to 20 carbon atoms). They generally contain heteroatoms such as sulfur and nitrogen. The nitrogen content is usually between 1 and 5000 ppm by weight, and the sulfur content is between 0.01 and 5% by weight.

The catalysts of this invention are also advantageously used preferably during the pretreatment of catalytic cracking feedstocks and in the first stage of a soft hydrocracking or hydroconversion. They are then usually used in combination with an acid catalyst that may or may not be zeolitic for the second treatment stage.

The hydrorefining conditions, such as temperature, pressure, hydrogen recycling rate, hourly volumetric flow rate, can be very variable based on the nature of the feedstock, the quality of the desired products and installation used by the refiner. The temperature is in general higher than 200° C. and often between 250° C. and 480° C. The pressure is higher than 0.05 MPa and often higher than 1 MPa. The hydrogen recycling rate is at least 80 and often between 50 and 5000 normal liters of hydrogen per liter of feedstock. The hourly volumetric flow rate is in general between 0.1 and 20 volumes of feedstock per volume of catalyst and per hour.

The catalysts of this invention are preferably subjected to a sulfurization treatment that makes it possible to transform, at least in part, the metallic radicals into sulfide before they are brought into contact with the feedstock to be treated. This activation treatment by sulfurization is well known to one skilled in the art and can be carried out by any method that is already described in the literature.

A standard sulfurization method that is well known to one skilled in the art consists in heating the mixture of solids under a stream of a mixture of hydrogen and hydrogen sulfide or under a stream of a mixture of nitrogen and hydrogen sulfide at a temperature of between 150 and 800° C., preferably between 250 and 600° C., generally in a flushed-bed reaction zone.

The results that are important to the refiner are the HDS activity, the HDN activity and the conversion activity. The desired goals should be achieved under conditions that are compatible with the economic reality. Thus, the refiner seeks to decrease the temperature, the pressure, and the hydrogen recycling rate and to maximize the hourly volumetric flow rate. It is known that the activity can be increased by a temperature increase, but it is often to the detriment of the stability of the catalyst. The stability or service life improves with an increase of the pressure or the hydrogen recycling rate, but this is done to the detriment of the economy of the process.

The following examples illustrate this invention without, however, limiting its scope.

EXAMPLE 1

Preparation of a Hydrocracking Catalyst Substrate that Contains a Partially Amorphous Y Zeolite A USY commercial ultrastable dealuminified zeolite with an overall Si/Al molar ratio that is equal to 15.2, an Si/Al framework ratio 29, a crystalline parameter that is equal to 24.29Å that contains 0.03% by weight of Na, that has a peak rate of 0.48 and that has a crystalline fraction of 85%, is amorphized by a hydrothermic treatment at 620° C. for 5 hours in the presence of a partial pressure of water vapor equal to 0.5 bar absolute. The zeolite is then subjected to an acid attack that is carried out under the following conditions: normality of the acid 0.85N, duration of 3 hours and temperature equal to 95° C. A last hydrothermic treatment that is identical to the first with a partial pressure of water vapor that is equal to 0.02 bar is applied to the zeolite. At the end of these treatments, the partially amorphous zeolite has a peak rate of 0.26, a crystalline fraction of 44%, an overall Si/Al ratio of 72, and an Si/Al$^{IV}$ framework ratio of 80, a pore volume of 0.35 ml of liquid nitrogen per gram of which 29% consists of pores whose diameters are at least equal to 5 nanometers (50 Å). A hydrocracking catalyst substrate that contains this Y zeolite is produced in the following way:

50 grams of the partially amorphous Y zeolite that is described above is mixed with 50 grams of a matrix that consists of ultrafine tabular boehmite or alumina gel that is marketed under the name SB3 by the Condea Chemie GmbH Company. This powder mixture was then mixed with an aqueous solution that contains nitric acid at 66% (7% by weight of acid per gram of dry gel) then mixed for 15 minutes. At the end of this mixing, the paste that is obtained is passed through a die that has cylindrical orifices with a diameter that is equal to 1.4 mm. The extrudates are then dried for one night at 120° C. under air and then calcined at 550° C. under air.

EXAMPLE 2

Preparation of Catalysts that Contain a Partially Amorphous Y Zeolite

The substrate extrudates that contain a partially amorphous Y zeolite, prepared in Example 1, are impregnated in the dry state by an aqueous solution of a mixture of ammonium heptamolybdate and nickel nitrate, dried for one night at 120° C. under air and finally calcined under air at 550° C. The contents by weight of the oxides of the NiMoY$_2$ catalyst that are obtained are indicated in Table 1.

The extrudates are impregnated in the dry state by an aqueous solution of a mixture of ammonium heptamolybdate, nickel nitrate and orthophosphoric acid, dried for one night at 120° C. under air and finally calcined under air at 550° C. The contents by weight of the NiMoPY$_2$ catalyst oxides that are obtained are indicated in Table 1.

We then impregnated the sample of the NiMoPY$_2$ catalyst by an aqueous solution that contains ammonium biborate and the Rhodorsil EP1 silicone emulsion, and we obtained the NiMoPBSiY$_2$ catalyst. The final oxide contents of the catalysts thus prepared are indicated in Table 1.

The analysis, by electronic microprobe, of the NiMoPB-SiY$_2$ and NiMoNbPBSY$_2$ catalysts shows that the silicon that is added to the catalyst according to the invention is mainly located on the matrix and is in amorphous silica form.

EXAMPLE 3

Preparation of Catalysts that Contain a Partially Amorphous Y Zeolite and Niobium The catalysts of Example 2 above are impregnated by an aqueous solution of niobium oxalate Nb(HC$_2$O$_4$)$_5$, oxalic acid and ammonium oxalate. The aqueous solution that contains the niobium is prepared from 1330 ml of water in which 33 g of oxalic acid, 37.2 g of ammonium oxalate and 92.3 g of niobium oxalate are dissolved. This makes it possible to deposit about 5% by weight of Nb on the catalyst. To prepare the solution, the mixture of oxalic acid and ammonium oxalate is dissolved in a first step, and when the solution is clear, said solution is heated to 55° C. and niobium oxalate is added. Water is then added to obtain 1330 ml of solution.

The catalysts of Example 2 above are impregnated by the so-called excess solution method. 1330 ml of solution is brought into contact with 380 g of catalyst. At the end of two hours, the extrudates are recovered. The latter are then dried for one night at 120° C. under a stream of dry air. The final contents of oxides of catalysts NiMoNbY$_2$, NiMoNbPY$_2$ and NiMoNbPBSiY$_2$ that are thus obtained are indicated in Table 1.

TABLE 1

Characteristics of the Catalysts of the Y$_2$ Series

| Catalyst | NiMo-Y$_2$ | NiMo-NbY$_2$ | NiMoP-Y$_2$ | NiMoNb-PY$_2$ | MoPB-SiY$_2$ | NiMoNb-PBSiY$_2$ |
|---|---|---|---|---|---|---|
| MoO$_3$ (% by weight) | 13.9 | 12.8 | 13.4 | 12.2 | 12.3 | 11.8 |
| Nb$_2$O$_5$ (% by weight) | 0 | 8.5 | 0 | 8.4 | 0 | 6.4 |
| NiO (% by weight) | 2.9 | 3.0 | 2.9 | 2.9 | 2.8 | 2.8 |
| P$_2$O$_5$ (% by weight) | 0 | 0 | 4.6 | 4.4 | 4.2 | 4.3 |
| B$_2$O$_3$ (% by weight) | 0 | 0 | 0 | 0 | 1.4 | 1.5 |
| SiO$_2$ (% by weight) | 41.0 | 38.3 | 39.0 | 36.5 | 40.7 | 37.6 |
| Addition to 100% that consists of for the most part Al$_2$O$_3$ (% by weight) | 42.2 | 39.4 | 40.1 | 37.8 | 38.6 | 35.8 |

EXAMPLE 4

Comparison of the Catalysts for Hydrocracking a Vacuum Gas Oil with Partial Conversion The catalysts whose preparations are described in Examples 1 to 3 are used under moderate pressure hydrocracking conditions on a petroleum feedstock whose main characteristics are as follows:

| | |
|---|---|
| Density (20/4) | 0.921 |
| Sulfur (% by weight) | 2.46 |
| Nitrogen (ppm by weight) | 1130 |
| Simulated distillation | |
| Starting point | 365° C. |
| 10% point | 430° C. |
| 50% point | 472° C. |
| 90% point | 504° C. |
| Final point | 539° C. |
| Pour point | +39° C. |

The catalytic test unit comprises two fixed-bed reactors with upward circulation of the feedstock ("up-flow"). In the first reactor, the one in which the feedstock passes first, the HTH548 hydrotreatment first-stage catalyst that is sold by the Procatalyse Company and that comprises an element of group VI and an element of group VIII that are deposited on alumina is introduced. In the second reactor, the one in which the feedstock passes last, one of the hydrocracking catalysts prepared in Examples 1 to 3 is introduced. In each of the reactors, 40 ml of catalyst is introduced. The two reactors operate at the same temperature and at the same pressure. The operating conditions of the test unit are as follows:

| | |
|---|---|
| Total pressure | 5 MPa |
| Hydrotreatment catalyst | 40 cm$^3$ |
| Hydrocracking catalyst | 40 cm$^3$ |

-continued

| | |
|---|---|
| Temperature | 400° C. |
| Hydrogen flow rate | 20 l/h |
| Feedstock flow rate | 40 cm³/h |

The two catalysts undergo an in-situ sulferization stage before reaction. We note that any in-situ or ex-situ sulferization method is suitable. Once the sulferization is carried out, the feedstock that is described above can be transformed.

The catalytic performances are expressed in terms of gross conversion at 400° C. (CB), by coarse selectivity of middle distillates (SB) and by hydrodesulfurization conversions (HDS) and hydrodenitrating conversions (HDN). These catalytic performances are measured in the catalyst after a stabilization period, generally at least 48 hours, has elapsed.

Hydrodesulfurization conversion HDS is assumed to be equal to:

$$HDS=(S_{initial}-S_{effluent})/S_{initial}*100=(24600-S_{effluent})/24600*100$$

Hydrodenitrating conversion HDN is assumed to be equal to:

$$HDN=(N_{initial}-N_{effluent})/N_{initial}*100=(1130-N_{effluent})/1130*100$$

In the following table, we recorded hydrodesulfurization conversion HDS and hydrodenitrating conversion HDN for the catalysts.

TABLE 2

Catalytic Activities of the Catalysts with a Partially Amorphous Y Zeolite Base in Partial Hydrocracking at 400° C.

| | | HDS (%) | HDN (%) |
|---|---|---|---|
| NiMoY$_2$ | NiMo/Y$_2$ | 98.6 | 95.3 |
| NiMoNbY$_2$ | NiMoNb/Y$_2$ | 98.9 | 96.8 |
| NiMoPY$_2$ | NiMoP/Y$_2$ | 99.4 | 96.4 |
| NiMoNbPY$_2$ | NiMoNbP/Y$_2$ | 99.5 | 97.2 |
| NiMoPBSiY$_2$ | NiMoPBSi/Y$_2$ | 99.56 | 98.5 |
| NiMoNbPBSi Y$_2$ | NiMoNbPBSi/Y$_2$ | 99.8 | 98.9 |

The results of Table 2 show that the addition of niobium to the NiMo, NiMoP, NiMoPBSi catalysts that are supported on the substrates that contain alumina and a partially amorphous Y zeolite provides an improvement of the performances of the catalyst in hydrodesulfurization and mainly in hydrodenitrating.

EXAMPLE 5

Comparison of the Catalysts with a Partially Amorphous Y Base in Hydrocracking of a High-Conversion Vacuum Gas Oil The catalysts that contain the partially amorphous Y zeolite and niobium whose preparations are described in Examples 1 to 3 are used under high-conversion hydrocracking conditions (60–100%). The petroleum feedstock is a hydrotreated vacuum distillate whose main characteristics are as follows:

| | |
|---|---|
| Density (20/4) | 0.869 |
| Sulfur (ppm by weight) | 502 |
| Nitrogen (ppm by weight) | 10 |
| Simulated distillation | |
| Starting point | 298° C. |
| 10% point | 369° C. |
| 50% point | 427° C. |
| 90% point | 481° C. |
| Final point | 538° C. |

This feedstock was obtained by hydrotreatment of a vacuum distillate on an HR360 catalyst that is sold by the Procatalyse Company and that comprises an element of group VIB and an element of group VIII that are deposited on alumina.

Before hydrotreatment, the feedstock contained 1500 ppm of nitrogen and 3.2% by weight of sulfur. An H$_2$S precursor sulfur-containing compound and an ammonia precursor nitrogen-containing compound are added to the hydrotreated feedstock to simulate the partial pressures of H$_2$S and NH$_3$ in the hydrocracking stage. The feedstock that is thus prepared is injected into the hydrocracking test unit that comprises a fixed-bed reactor with upward circulation of the feedstock ("up-flow") into which is introduced 80 ml of catalyst. Before the feedstock is injected, the catalyst is sulfurized by an n-hexane/DMDS+aniline mixture up to 320° C. We note that any in-situ or ex-situ sulfurization method is suitable. Once the sulfurization is carried out, the feedstock that is described above can be transformed. The operating conditions of the test unit are as follows:

| | |
|---|---|
| Total pressure | 9 MPa |
| Catalyst | 80 cm³ |
| Temperature | 360–420 ° C. |
| Hydrogen flow rate | 80 l/h |
| Feedstock flow rate | 80 cm³/h |

The catalytic performances are expressed by the temperature that makes it possible to reach a gross conversion level of 70% and by the coarse selectivity of middle distillates 150–380° C. These catalytic performances are measured in the catalyst after a stabilization period, generally at least 48 hours, has elapsed.

Gross conversion CB is assumed to be equal to:

$$CB=\% \text{ by weight of } 380° C.^{Less} \text{ of the effluent}$$

Coarse selectivity SB of middle distillate is assumed to be equal to:

$$SB=100*\text{weight of the fraction }(150° C.–380° C.)/\text{weight of the fraction } 380° C.^{Less} \text{ of the effluent}$$

The reaction temperature is set to reach a gross conversion CB that is equal to 70% by weight. In Table 3 below, we recorded the reaction temperature and the coarse selectivity for the catalysts that are described in Table 1.

TABLE 3

Catalytic Activities of the High-Conversion Hydrocracking Catalysts (70%)

| | | T(° C.) | Selectivity of Middle Distillate (150–380° C.) (% by weight) |
|---|---|---|---|
| NiMoY$_2$ | NiMo/Y$_2$ | 394 | 70.4 |
| NiMoNbY$_2$ | NiMoNb/Y$_2$ | 392 | 70.7 |
| NiMoPY$_2$ | NiMoP/Y$_2$ | 393 | 71.2 |
| NiMoNbP Y$_2$ | NiMoNbP/Y$_2$ | 389 | 71.5 |
| NiMoPBSiY$_2$ | NiMoPBSi/Y$_2$ | 387 | 72.5 |
| NiMoNbPBSiY$_2$ | NiMoNbPBSi/Y$_2$ | 384 | 72.8 |

Table 3 shows that the use of a catalyst according to the invention that contains the partially amorphous Y zeolite and niobium leads to higher conversion levels (i.e., lower conversion temperatures for a given conversion of 70% by weight) relative to the catalysts that contain the same zeolite but do not contain niobium. Furthermore, at an iso-conversion of 70% by weight, all of the catalysts that contain a partially amorphous Y zeolite and niobium according to the invention lead to middle distillate selectivities (150–380° C. fraction) that are improved relative to those that are recorded in the case of catalysts that contain the same zeolite but do not contain niobium.

What is claimed is:

1. A catalyst comprising: (1) at least one matrix and at least one partially amorphous Y zeolite that has a peak ratio that is less than 0.4, and a crystalline fraction, expressed relative to a reference zeolite in sodium form (Na), that is less than 60%, (2) at least one element selected from group VB, (3) at least one hydro-dehydrogenating element selected from the group consisting of the elements of group VIB and group VIII, and (4) at least one promoter element that is selected from the group consisting of phosphorus, boron, and silicon, wherein the zeolite has the following characteristics:
an overall Si/Al ratio that is greater than 15,
an Si/Al$^{iv}$ framework ratio that is greater than 15,
a pore volume that is at least equal to 0.2 ml/g wherein between 8% and 50% of the pore volume consists of pores that have a diameter of at least 5 nm.

2. Catalyst according to claim 1, in which the element of group VB is niobium.

3. The catalyst according to claim 1, wherein the promoter element is deposited on the catalyst and mainly located on the matrix.

4. The catalyst according to claim 1, further comprising at least one element of group VIIA.

5. The catalyst according to claim 1, further comprising at least one element of group VIIB.

6. The catalyst according to claim 5, where the element of group VIIB is manganese.

7. The catalyst according to claim 1, that contains in % by weight relative to the total mass of the catalyst:
   0.1 to 99.8% of at least one oxide-type amorphous or poorly crystallized porous mineral matrix,
   0.1 to 99.8% of partially amorphous Y zeolite,
   0.1 to 60% of at least one element of group VB,
   0.1 to 50% of at least one hydro-dehydrogenating element,
   0.1 to 20% of at least one element that is selected from the group that is formed by boron, silicon, and phosphorous,
   0 to 20% of at least one element of group VIIA,
   0 to 20% of at least one element of group VIIB.

8. The catalyst according to claim 1, wherein the matrix is selected from the group consisting of alumina, silica-alumina, aluminates, and silica.

9. A process for converting a hydrocarbon feedstock comprising contacting the feedstock with the catalyst of claim 1.

10. The process according to claim 9 comprising hydrocracking the feedstock with the catalyst.

11. The process according to claim 10, wherein the hydrocracking is conducted at a temperature higher than 200° C., a pressure higher than 0.1 MPa, a volumetric flow rate of 0.1–20 h$^{-1}$ and a hydrogen recycling of at least 50 Nl/l of feedstock.

12. The process according to claim 11, wherein the pressure is higher than 2 MPa and less than 12 MPa, the temperature is at least 230° C., the volumetric flow rate is 0.1–10 h$^{-1}$ and the hydrogen recycling is at least 100 Nl/l of feedstock, wherein the conversion is less than 55%.

13. The process according to claim 11, wherein the pressure is at least 5 MPa, and the conversion is greater than 55%.

14. The process according to claim 11, wherein the feedstock is subjected to hydrotreatment before being hydrocracked.

15. The process according to claim 9 comprising hydrorefining the feedstock with the catalyst.

16. The process according to claim 15, wherein the hydrorefining is conducted at a temperature higher than 200° C., a pressure higher than 0.05 MPa, a hydrogen recycling rate of at least 80 Nl/l of feedstock and an hourly volumetric flow rate of 0.1–20 h$^{-1}$.

17. The process according to claim 9, wherein the catalyst is previously sulfurized.

* * * * *